United States Patent [19]

Tobita et al.

[11] Patent Number: 5,781,434

[45] Date of Patent: Jul. 14, 1998

[54] CONTROL SYSTEM FOR COMMUNICATION APPARATUS

[75] Inventors: Tsunehiro Tobita; Yukihiro Seki; Ryuichi Hattori, all of Yokohama; Yuji Miyagawa, Owariasahi; Shigeru Sakurai, Kasugai; Michiyuki Suzuki, Nisshin; Ichiro Ote, Chigasaki, all of Japan

[73] Assignees: Hitachi, Ltd., Tokyo; Hitachi Chubu Software, Ltd., Aichi-ken, both of Japan

[21] Appl. No.: 543,145

[22] Filed: Oct. 13, 1995

[30] Foreign Application Priority Data

Oct. 19, 1994 [JP] Japan .................................. 6-253206

[51] Int. Cl.[6] ................................................ G05B 19/10
[52] U.S. Cl. .......................... 364/184; 364/131; 364/141; 395/182.08; 395/182.2; 395/182.12
[58] Field of Search ............................ 364/184, 131, 364/133, 141, 142, 514 R, 514 A, 514 B, 514 C, 550, 551.01, 707; 395/182.08, 182.12, 182.2, 182.22, 750; 379/94–96, 26, 93; 370/216, 228; 340/825.06, 825.16, 825.29

[56] References Cited

U.S. PATENT DOCUMENTS

| 5,285,198 | 2/1994 | Asahina | 340/825.16 |
|---|---|---|---|
| 5,515,418 | 5/1996 | Yamaguchi et al. | 370/216 |
| 5,592,675 | 1/1997 | Itoh et al. | 395/750 |
| 5,596,628 | 1/1997 | Klein | 379/93 |
| 5,603,038 | 2/1997 | Crump et al. | 395/750 |

FOREIGN PATENT DOCUMENTS 5257914 10/1993 Japan .

OTHER PUBLICATIONS

Transistor Technology Special No. 9 CQ Publishing Co. pp. 36–39, 42–45 (No translation provided). (No date with month).
EISA Specification Version 3.12 pp. 292–293 (No date with month).
Pentium Family User's Manual vol. 1: Data Book 1994, 30–4, 5 (No date with month).
Intel Networking Networking Components (82595TX Ethernet) 1–8–1–11 (No date with month).

*Primary Examiner*—Emanuel Todd Voeltz
*Assistant Examiner*—Hal P. Wachsman
*Attorney, Agent, or Firm*—Antonelli, Terry, Stout & Kraus, LLP

[57] ABSTRACT

An information processing system includes a modem communicating with a remote console through a telephone line, an information processing apparatus communicating with the remote console through the modem, a service processor, a power supply continuously supplying power to the modem and the service processor, a power supply supplying power to the information processing apparatus according to commands from the service processor, and a switch connecting the modem to the service processor or the information processing apparatus in accordance with a switching signal from the service processor. The service processor controls the switch to connect the modem to the service processor when the information processing apparatus power supply is in the off state. The service processor outputs a power-on command when the service processor receives a power-on request of the information processing apparatus power supply from the remote console through the telephone line and the modem and the switch connects the modem to the information processing apparatus when the execution of the power-on command is completed.

23 Claims, 14 Drawing Sheets

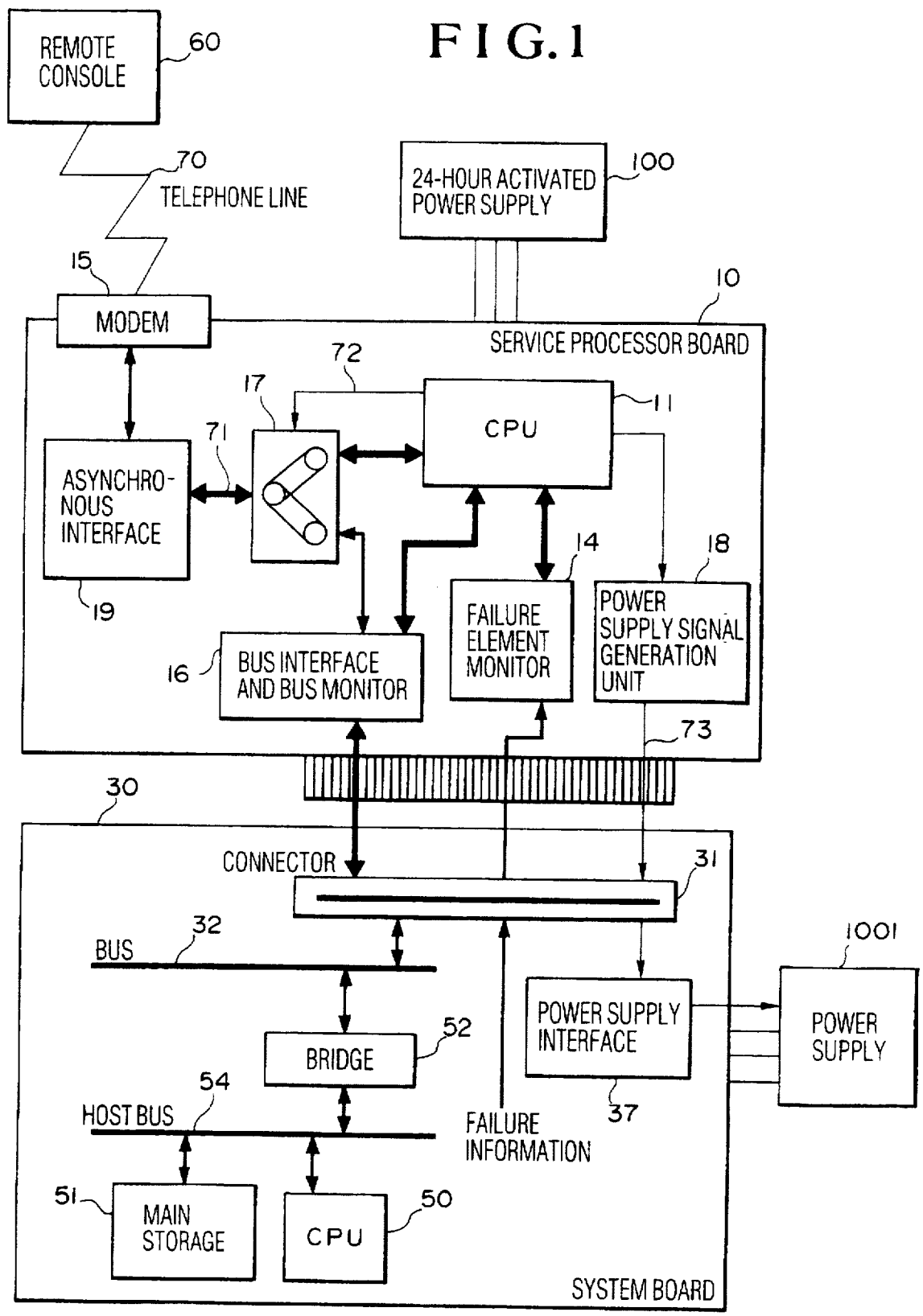

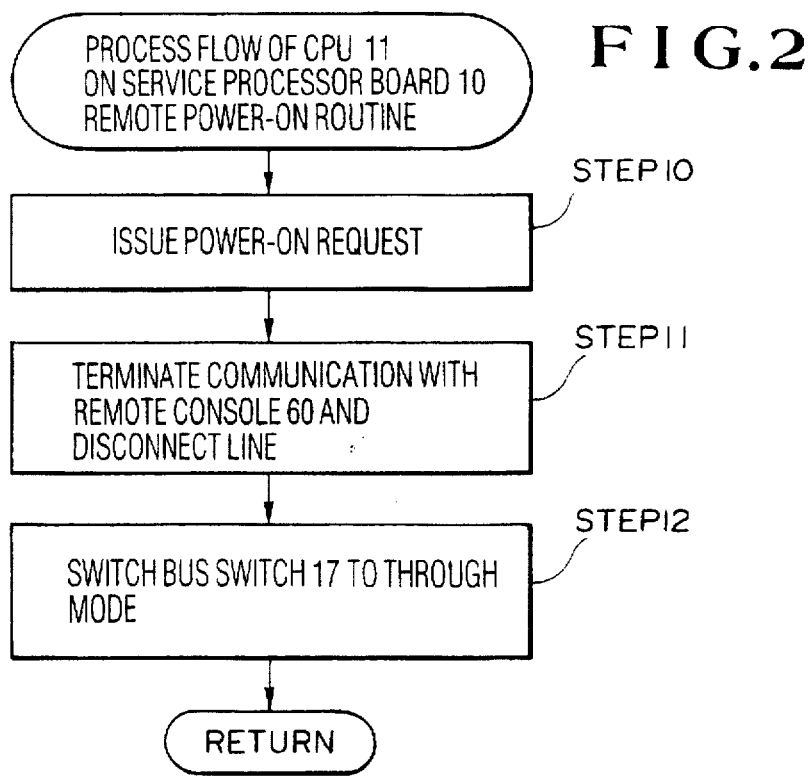
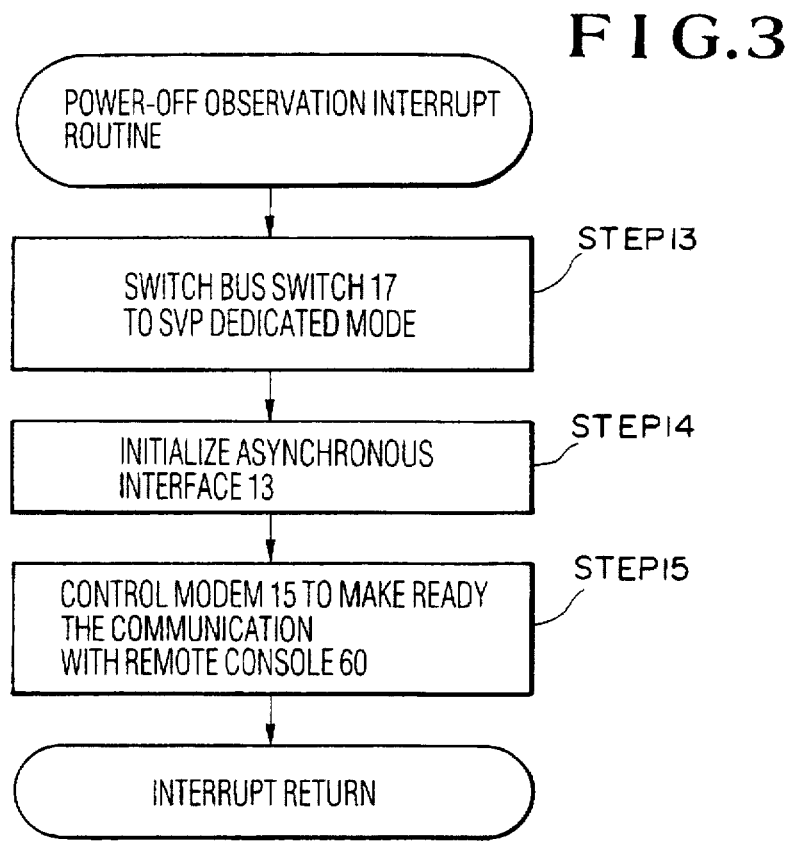

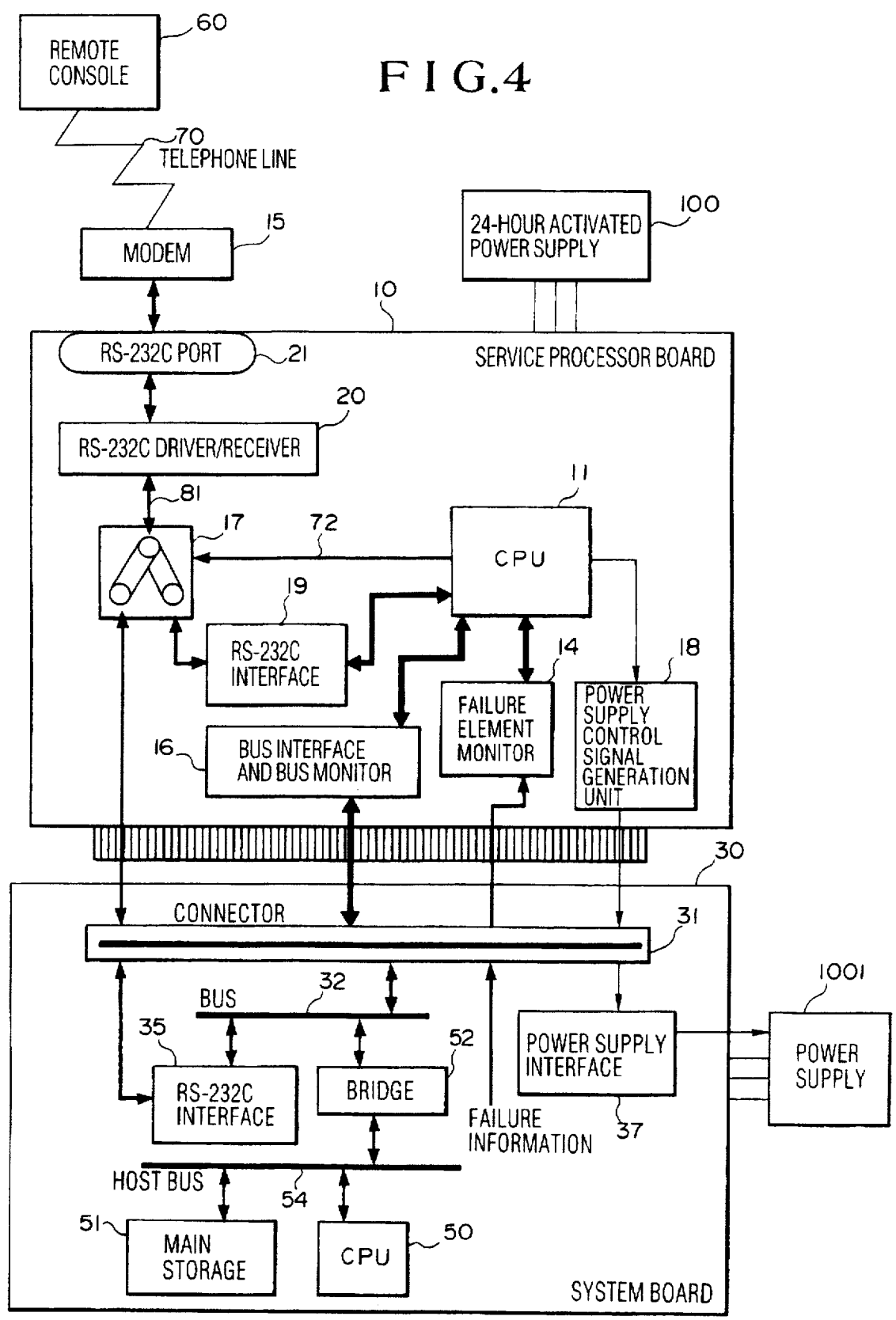

CONTROL SYSTEM FOR COMMUNICATION APPARATUS

BACKGROUND OF THE INVENTION

The present invention relates to a control system for a communication apparatus for communicating with a remote console through a communication line.

In a client-server system, reliability of the server is an important factor. In many server systems, a function to predict a failure by observing and diagnosing a state of the server hardware or restoring the system by automatically resetting and restarting up the system when the system is down.

For example, in JP-A-5-257914, dedicated hardware for supporting the above function is provided by a system manager. In JP-A-5-257914, means to observe a signal on a bus to which the system manager is connected or means for acquiring failure information from an operating system (hereinafter referred to as an OS) operating on the server through a device driver of the system manager is provided, and when the occurrence of failure is observed by the means, a modem provided for communication between a remote console and the system manager through a telephone line is controlled to inform it to the remote console. In this case, the modem is controlled by the system manager and a program for the control is provided in firmware for the system manager in JP-A-5-257194.

On the other hand, in some of network OS's which are populated today, the remote console connected through the modem and the telephone line is used as a client. For example, "Netware System" marketed by Novell Inc, Provo, Utah, U.S.A. provides the above function so that the remote console can receive services of the server through the telephone line and the modem. When the OS as shown in the "Netware System" is operated on the system shown in JP-A-5-257914, the communication is made through the modem and the telephone line which are under the control of the OS in order for the remote user to receive the service as the client of the OS. In this case, if the OS overruns by a failure in the hardware of the server, the remote user can no longer communicate with the server.

In JP-A-5-257914, the system manager is connected to a dedicated modem which is under the system manager, other than the modem which is under the control of the network OS so that it detects the failure of the server and informs it to a remote system operator who, in turn, can reset the network OS of the overrun server system through the system manager and the second modem which is under the control of the system manager.

In the system of JP-A-5-257914, countermeasure of the failure can be realized by providing two sets of telephone line and modem, one set for the system manager and the other for the network OS operation on the server.

In the prior art system, when a failure occurs and the system overruns while he remote user receives the service of the network OS as the client through the network OS telephone line and modem, the remote user is suddenly intercepted in the communication with the server. The remote user may know the occurrence of failure in the server by the interception of the communication but he should disconnect the line and wait until the server is restored. When the server is provided with the system manager for conducting the failure management, the remote user must reconnect the modem connected to the system manager communication line to issue a request to restart the system and restore the server from the failure in order to receive the service again from the network OS. As a result, the prior art system requires two sets of communication line and modem, one set for the network OS and the other for the system manager.

If the server power supply fails when the remote user accesses through the communication line, the remote server cannot receive the service.

Further, when a failure occurs in the server, all failures are informed in the prior art system so that even information not necessary to the user is informed.

Further, the existing information processing system which has no system manager function cannot additionally provide the system manager easily.

Assuming that a plurality of servers scattered among remote stations are interconnected through the communication network such as WAN (Wide Area Network), the client connects with any server through the telephone line and the modem and that server connects with other servers through the communication network so that the servers and the client connected through the communication network may share resources with each other. However, to this end, multi-function of the network is essential. By the multi-function, the necessity of the management function to improve the reliability of the server increases more and more. Accordingly, the client function of the network OS and the function to manage the server are no longer independent but need be integrated. In the prior art system, however, they are independent so that more hardware resources are required.

SUMMARY OF THE INVENTION

It is an object of the present invention to provide an information processing system which requires only one set of communication line and modem instead of the two sets of communication line and modem required in the prior art system in order for the remote user to receive the service from the server so that the hardware resources such as modems and communication lines may be reduced and the burden to the remote user to reconnect the line is reduced.

It is another object of the present invention to provide an information processing system which allows the remote user to rapidly restore from the failure when the failure occurs in the server.

It is another object of the present invention to provide an information processing system which allows the remote user to receives the service through the communication line even if the server power fails so that the power consumption of the server is saved.

It is another object of the present invention to provide an information processing system which informs the failure to the remote user only when it is determined necessary depending on the content of the failure.

It is another object of the present invention to facilitate the provision of a system manger in an existing information processing system.

It is another object of the present invention to provide an information processing system which can save the power consumption of the system manager when the system manager is powered over 24 hours so that the information processing apparatus connected through the communication apparatus and the communication line communicates with a system manger even if the server power supply is off and the hardware information of the server is acquired and the turn on/off of the server power supply is controlled.

It is another object of the present invention to provide an information processing system which can recognize a state of the server by receiving the failure information from the manager or the overrun information of the operating system when the failure occurs in the server and the network operating system operating on the server overruns and even if the communication failure occurs in any information processing apparatus communicating with the operating system.

The information processing system of the present invention comprises a communication apparatus for communicating with an external terminal through a communication line, an information processing apparatus for communicating with the external terminal through the communication apparatus, processing means for managing the information processing apparatus and switching means switching the control of the communication apparatus in accordance with a switching signal from the processing means such that at least one of the information processing apparatus and the processing apparatus controls the communication apparatus.

In the above information processing system, the processing means comprises failure detection means for detecting the failure of the information processing apparatus, and when the failure inform signal is inputted from the failure detection means, a first switching signal is supplied to the switching means to recover the information processing apparatus, and when the failure is recovered, a second switching signal is supplied to the switching means so that the information processing apparatus controls the communication apparatus.

In the above information processing apparatus, the processing means sends an on/off command to the power supply in accordance with request information to turn on or off the power supply from the external terminal.

In the above information processing system, hold means for holding the type of failure occurred in the information processing apparatus and the number of times of execution of recovery process conducted by the processing means for each failure is provided.

A communication service board which mounts thereon the failure detection means for detecting the failure of the information processing apparatus, the processing means for managing the information processing apparatus and the switching means for switching the control of the communication apparatus in accordance with the switching signal from the processing means such that at least one of the information processing apparatus and the processing means controls the communication apparatus is used as an interface for the communication between the information processing apparatus and the external terminal. The communication service board is continuously powered from power supply means.

In order to save the power consumption of the communication service board which is continuously powered by the power supply means, power saving is conducted by using a power saving function provided in the processing apparatus such as a CPU on the communication service board when the communication service board and the operating system operating on the server do not communicate with the information processing apparatus connected with the communication apparatus such as a modem through the communication line.

When the communication service board and the operating system operating on the server do not communicate with the information processing apparatus connected with the communication apparatus such as a modem through the communication line, the processing apparatus which does not cause a problem even if it is powered off on the communication service board is powered off.

The communication apparatus on the communication service board and the communication apparatus on the server controlled by the operating system operating on the server are connected in daisy chain fashion and the communication service board communicates with the operating system operating on the server so that the operating system has means for acquiring the address information of any information processing apparatus communicating through the communicating apparatus on the server and holding the information, and when the operating system overruns or a failure occurs in the server, the failure information or the state of the operating system is informed by the communication apparatus on the communication board to the information processing apparatus with which the operating system has been communicating, based on the address information.

In accordance with the present invention, since the switching means switches the control of the communication apparatus in accordance with the switching signal from the processing means for managing the information processing means such that at least one of the information processing apparatus and the processing means controls the communication apparatus, the control of the communication apparatus may be conducted by the managing processing apparatus when the failure occurs in the information processing apparatus so that an access request from the external terminal may be accepted when the failure occurs.

When the failure notice information is inputted from the failure detection means, the processing means supplies the first switching signal to the switching means and recovers the information processing apparatus, and when the failure is recovered, the second switching signal for conducting the control of the communication apparatus by the information processing apparatus is supplied to the switching apparatus so that the failure of the information processing apparatus may be automatically restored and after the restoration of the failure, normal access to the external terminal is permitted.

The processing means can supply the power to the server by sending an on command to the power supply in accordance with the server power supply on request information from the remote user even if the server power supply fails. Accordingly, the server power supply is normally turned off and it is turned upon request from the remote server so that the server power consumption is saved.

The processing means determines whether the information is one to be informed to the user or not in accordance with the type of failure of the information processing apparatus and the number of times of recovery process conducted by the processing means, detected by the failure detection means so that the user can receive only the necessary information from the information processing system.

Furthermore, since the communication service board is a single board comprising communication apparatus for communicating between the information processing apparatus and the external terminal, the failure detection means for detecting the failure of the information processing apparatus, the processing means for managing the information processing apparatus, the switching means for switching the control of the communication apparatus in accordance with the switching signal from the processing means such that at least one of the information processing apparatus and the processing means controls the communication apparatus, and the connecting terminal for connecting with the information processing apparatus, therefore, it can be easily provided to the existing information processing apparatus.

In addition, the communication service board is continuously powered from the power supply means. While the communication service board is structured so as to receive electric power supply from the power supply means.

BRIEF DESCRIPTION OF THE DRAWINGS

FIG. 1 shows a block diagram of one embodiment of the present invention.

FIG. 2 shows a flow chart of a remote power-on process of FIG. 1.

FIG. 3 shows a flow chart of a power-off observation interrupt routine.

FIG. 4 shows a block diagram of another embodiment of the present invention.

DETAILED DESCRIPTION OF THE PREFERRED EMBODIMENTS

Figure 5:
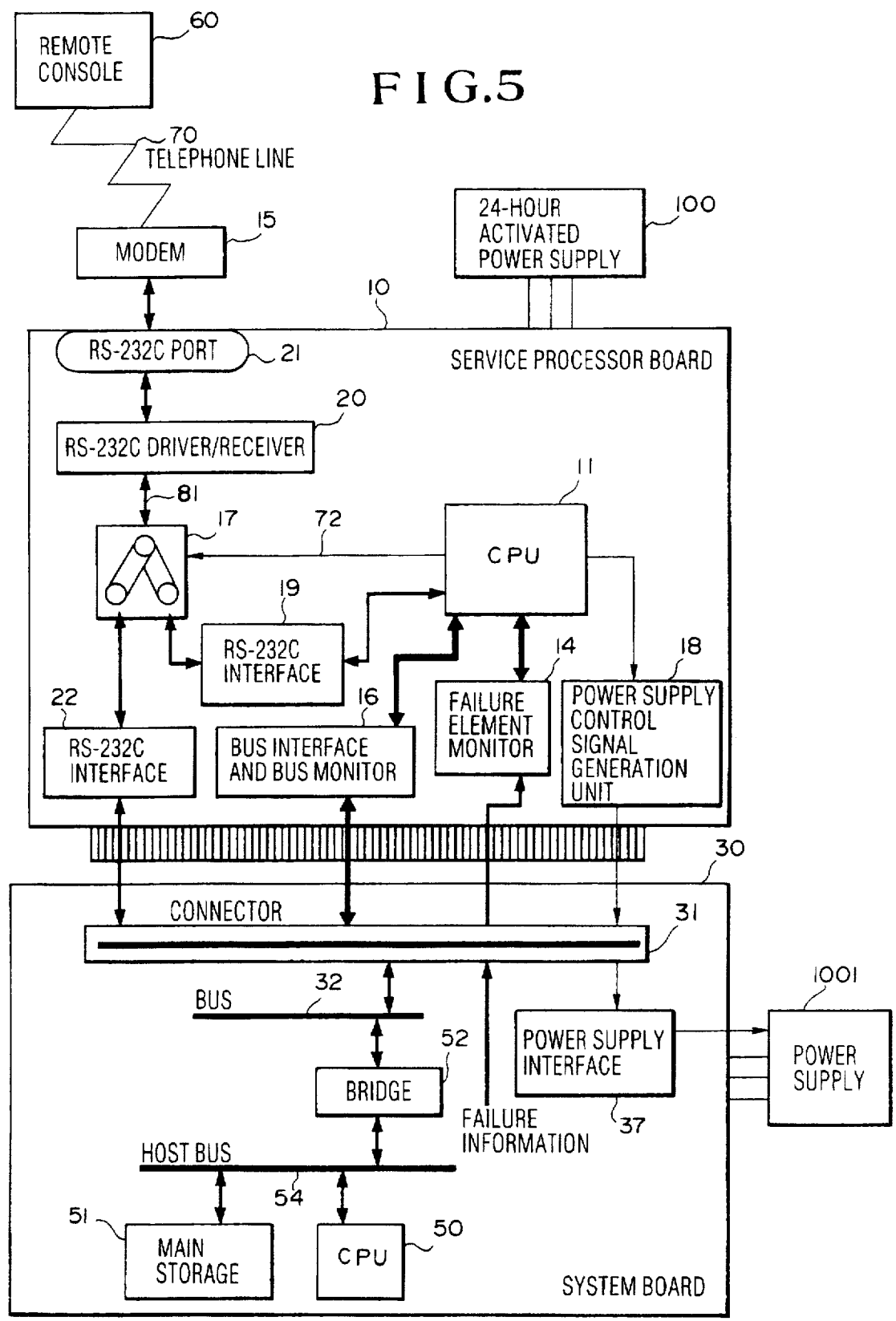
FIG. 5 shows a block diagram of another embodiment of the present invention.

FIG. 1 shows a block diagram of an embodiment implementing the present invention. Numeral 10 denotes a service processor board, numeral 11 denotes processing means (hereinafter referred to as a dedicated CPU) of the service processor board 10, numeral 16 denotes a bus interface and a bus monitor used by the CPU 11 for communicating with an information processing apparatus (hereinafter referred to as a system board) 30 through a standard bus 32 and connector 31 and for monitoring a state of power supply to the system board 30, numeral 14 denotes a failure element monitor which is one of failure detection means for observing failure information of the system board 30 inputted through the connector 31 of the system board 30, numeral 37 denotes a power supply interface for turning on and off a power supply 100 which supplies power to the system board 30, numeral 18 denotes a power supply control signal generation unit for generating a signal to control the power supply interface 37 and numeral 13 denotes an asynchronous interface for controlling a modem 15 connected to the service processor 10. Numeral 17 denotes a bus switch which is a switching means for selectively connecting control signals 71 of the asynchronous interface 13 to the CPU 11 or to the bus interface and bus monitor 16 and numeral 100 denotes a 24-hour power supply for supplying a power to the service processor board 10. Numeral 60 denotes a remote console for communicating with the service processor board 10 through a telephone line 70 and the modem 15.

In FIG. 1, even if the system board 30 is powered off, the service processor board 10 is activated over 24 hours by the separate 24-hour power supply 100 other than the power supply 1001 which powers to the system board 30. In this case, the bus switch 17 is set by the CPU 11 to a mode to connect the control signals 71 of the asynchronous interface 13 so that the CPU 11 controls the modem 15 through the asynchronous interface 13 to continuously communicate with the remote console 60.

FIG. 2 shows a flow chart of the CPU 11 on the service processor board when a power-on request is issued from the remote console through the telephone line.

In FIG. 1, when the remote console 60 issues the power-on request to the service processor board 10 through the telephone line and the modem 15, the CPU 11 recognizes the power-on request through the asynchronous interface 13 to call a power-on routine from the remote station (hereinafter referred to as a remote power-on routine). In the remote power-on routine, when the CPU 11 issues the power-on command to the power supply control signal generation unit 18 (step 10), a power-on signal 73 is driven into the power supply interface 37 of the system board from the power supply control signal generation unit 18 through the connector 31. When the power supply interface 37 receives the power-on signal 37, it turns on the power of the power supply 1001 to the system board 30. After the CPU 11 has issued the power-on command, it controls the asynchronous interface 13 to terminate the communication with the remote console 60 and disconnects the line between the remote console 60 and the modem 15 (step 11). Then, the CPU 11 switches to the mode in which the asynchronous interface 13 and the bus interface and bus monitor 16 are connected (hereinafter referred to as a through mode) by the switching signal 72 and terminates the remote power-on routine (step 12).

After the power-on, when the network OS booted by the processor of the system board is started, the control signals of the asynchronous interface have been connected to the bus interface and bus monitor 16. Accordingly, the network OS can recognize the presence of the asynchronous interface 13 through the bus 32, the connector 31 and the bus interface and bus monitor 16 and control it. Accordingly, the remote console 60 can receive the service of the OS through the modem 15, the asynchronous interface 13 and the bus interface and bus monitor 16.

In FIG. 1, since the control signals 71 of the asynchronous interface 13 are connected to the bus interface and bus monitor 16, the remote console 60 can receive the service of the network OS operating on the system board 30. Under this condition, when the OS user issues a system-down command and the power supply is shut off after the system-down, the CPU 11 on the service processor board 10 detects the shut-off of the power supply of the system board 30 through the bus interface and bus monitor 16 and executes the power-off observation interrupt routine shown in FIG. 3. In the power-off observation interrupt routine, the CPU 11 switches the bus switch 17 to the mode to connect the control signals 17 of the asynchronous interface 13 to the CPU 11 (hereinafter referred to as a SVP mode) (step 13). The CPU 11 initializes the asynchronous interface 13 through the control signals 71 of the asynchronous interface 13 (step 14), and when it completes the initialization, it controls the modem 15 through the asynchronous interface 13 to make the communication with the remote control ready (step 15) and terminates the power-off observation interrupt routine and the process returns.

FIG. 4 shows another embodiment of the present invention. General configuration and process flow of the embodiment of FIG. 4 are similar to those of the embodiment of FIG. 1 except that the interface of the modem 15 is an RS-232C interface which conform to the serial interface standard of the CCITT Recommendation V. 24. V. 28 defined by the EIA, US.

In FIG. 4, numeral 19 denotes an RS-232C interface dedicated to the CPU 11 and numeral 35 denotes an RS-232C interface dedicated to the OS which is executed by the CPU 50 on the system board 30. The modem 15 is connected to an RS-232C driver/receiver 20 through an RS-232C port and interface signals 81 of the RS-232C driver/receiver 20 are connected in one mode to the CPU 11 on the service processor mode 10 and in the other mode to the RS-232C interface on the system board 30 by switching the bus switch 17 and the buffer 36. Details of the RS-232C port 21, the RS-232C driver/receiver 20 and the RS-232C interface 19 are discussed in "Transistor Technology SPECIAL, No. 9, Special Issue, Personal Computer Peripheral Device Interfaces" published by CQ Publishing Co.

When the SVP dedicated mode shown in the embodiment of FIG. 4 is applied to the embodiment of FIG. 4, the interface signals 81 of the RS-232C driver/receiver 20 are connected to the RS-232C interface 19 and disconnected from the RS-232C interface 35 on the system board 30. When the through mode shown in the embodiment of FIG. 1 is applied to the embodiment of FIG. 4, the interface signals 81 of the RS-232C driver/receiver 20 are connected to the RS-232C interface 35 on the system board 30 and disconnected from the RS-232C interface 19 on the service processor board 10. The switching timing to the two modes and the detail of the two modes are similar to those of the embodiment of FIG. 1 and the explanation thereof is omitted. FIG. 5 shows other embodiment. General configuration and process flow of the embodiment of FIG. 5 are similar to those of FIG. 4 except that the RS-232C interface on the system board 30 is eliminated and an RS-232C interface 22 is added on the service processor 10. In FIG. 5, the added RS-232C interface 22 is controlled dedicatedly by the CPU 50 on the system board in the through mode in order for the OS operating on the system board 30 to access to the modem 15 through the RS-232C driver/receiver 20 and the RS-232C port 21. In this case, the interface signals 81 of the RS-232C driver/receiver 20 are connected to the RS-232C interface 22 dedicated to the OS operating on the system board 30. Similarly, in the embodiment of FIG. 5, in the SVP dedicated mode shown in the embodiment of FIG. 1, the interface signals 81 of the RS-232C driver/receiver 20 are connected to the RS-232C interface 19. The switching timing of the two modes and the detail of the two modes are similar to those of FIG. 1 and the explanation thereof is omitted.

Figure 6:
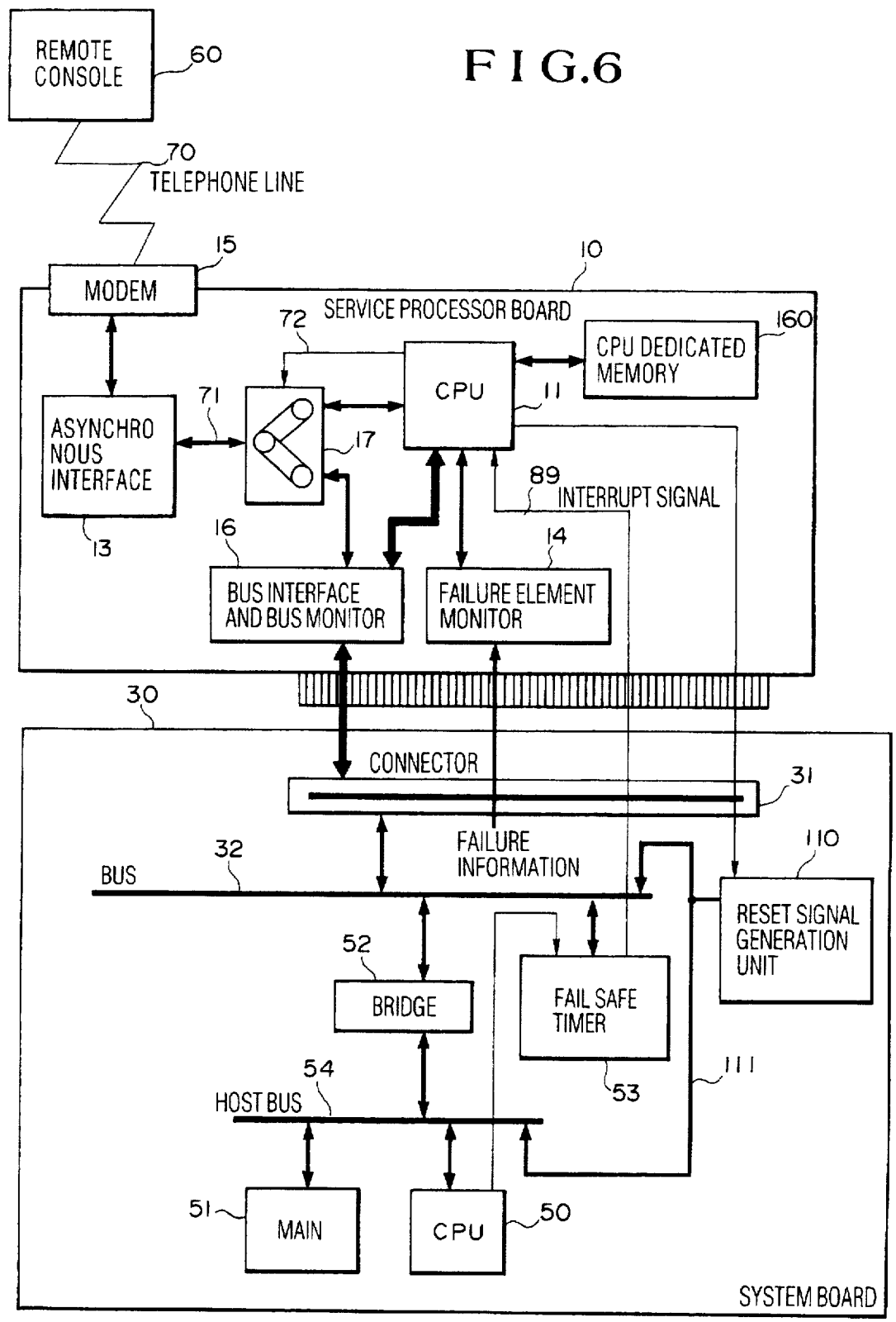
FIG. 6 shows a block diagram of a further embodiment of the present invention.
Figure 7:
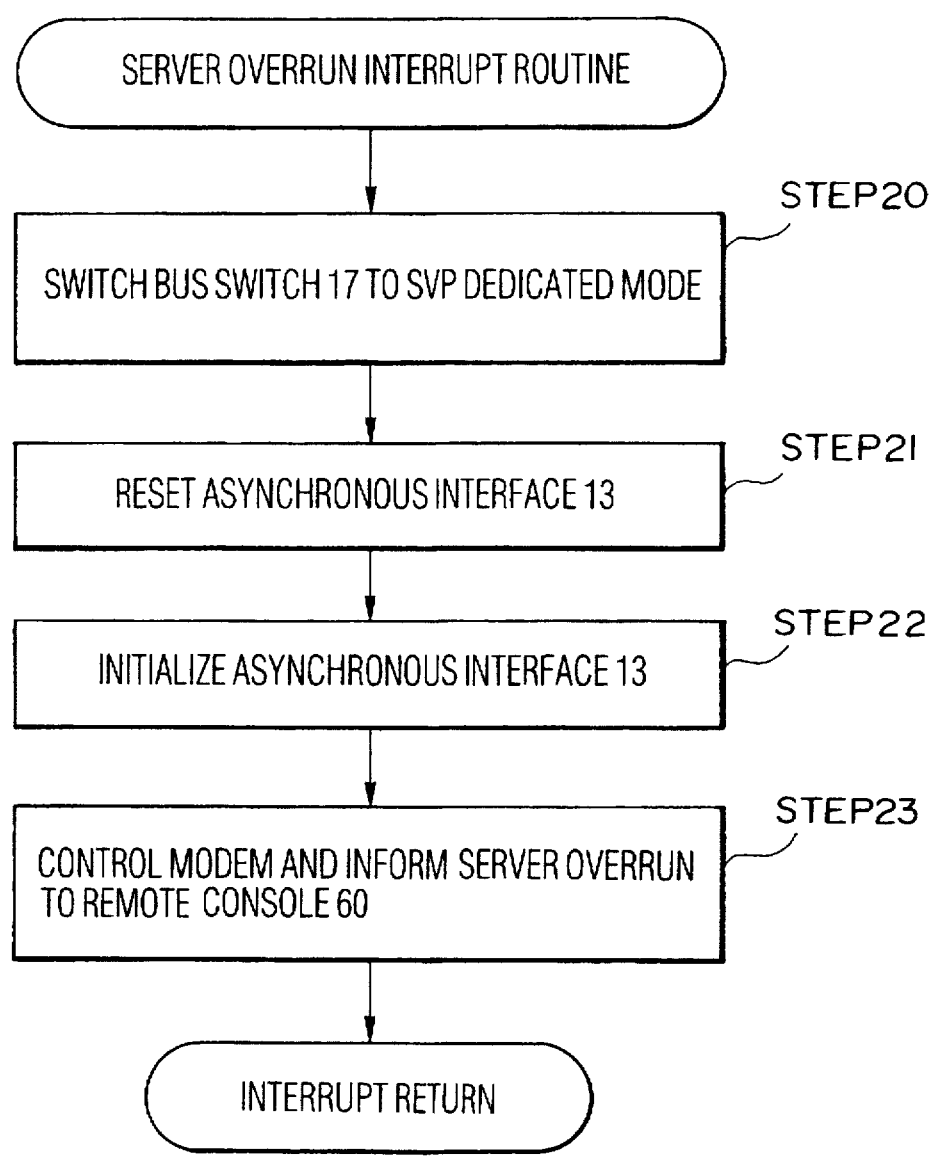
FIG. 7 shows a flow chart of a server overrun interrupt routine of a CPU 11 in the embodiment of FIG. 6.

FIG. 6 shows a block diagram of other embodiment of the present invention. In FIG. 6, a fail safe timer 53 connected to the bus 32 contains a timer, and when the timer is timed out, an interrupt signal 89 for interrupting the CPU 11 on the service processor board 10 is driven through a connector 31. Numeral 160 denotes a memory dedicated to the CPU 11 and used to store a program executed by the CPU 11. The OS executed by the CPU 50 operating on the system board 30 periodically resets the fail safe timer 53 through a host bus 54, a bridge 52 and a bus 32 so that the interruption to the CPU 11 by the time-out of the timer is not made. On the other hand, when the OS overruns, the timer is not reset and the timer is timed out and the interruption is made to the CPU 11. By this mechanism, the CPU 11 detects the overrun of the OS operation on the system board 30. The function of the fail safe timer 53 is described in the EISA SPECIFICATION Version 3.12, page 292 provided by the BCRP Services, Inc. FIG. 7 shows a process flow of the interrupt routine of the CPU 11 when the OS overruns during the operation in the through mode in the embodiment of FIG. 6 and the interruption is made to the CPU 11 by the fail safe timer 53. When the interruption is made to the CPU 11 by the overrun of the OS, the CPU 11 calls the server overrun interrupt routine and switches the bus switch 17 to the SVP dedicated mode (step 20). After the step 20, the asynchronous interface 13 is reset (step 21), the asynchronous interface 13 is initialized and the modem 15 is rendered controllable (step 22). In a step 23, the modem 15 is controlled and the overrun of the server is informed to the remote console 60. The server overrun interrupt routine is terminated and the process returns. After the overrun, the remote console 60 can communicate with the CPU 11 on the service processor board 10 by the server overrun interrupt routine and can issue a reset command of the system board 30 or the server to the CPU 11.

When the CPU 11 receives the reset command, it issues a reset signal generation command to a reset signal generation unit 110 on the system board so that the reset signals 111 are generated by the reset signal generation unit 110 and the processing apparatus on the host bus 54 and the bus 32 are reset. After the CPU 11 has executed the reset command, it switches the bus switch 17 to the through mode.

As a result, when the overrun OS is restarted, the remote console 60 can receive the service of OS executed by the CPU 11 by the through mode.

Further detail of the resetting of the system board 30 is not described here because it is not directly related to the present invention.

Figure 9:
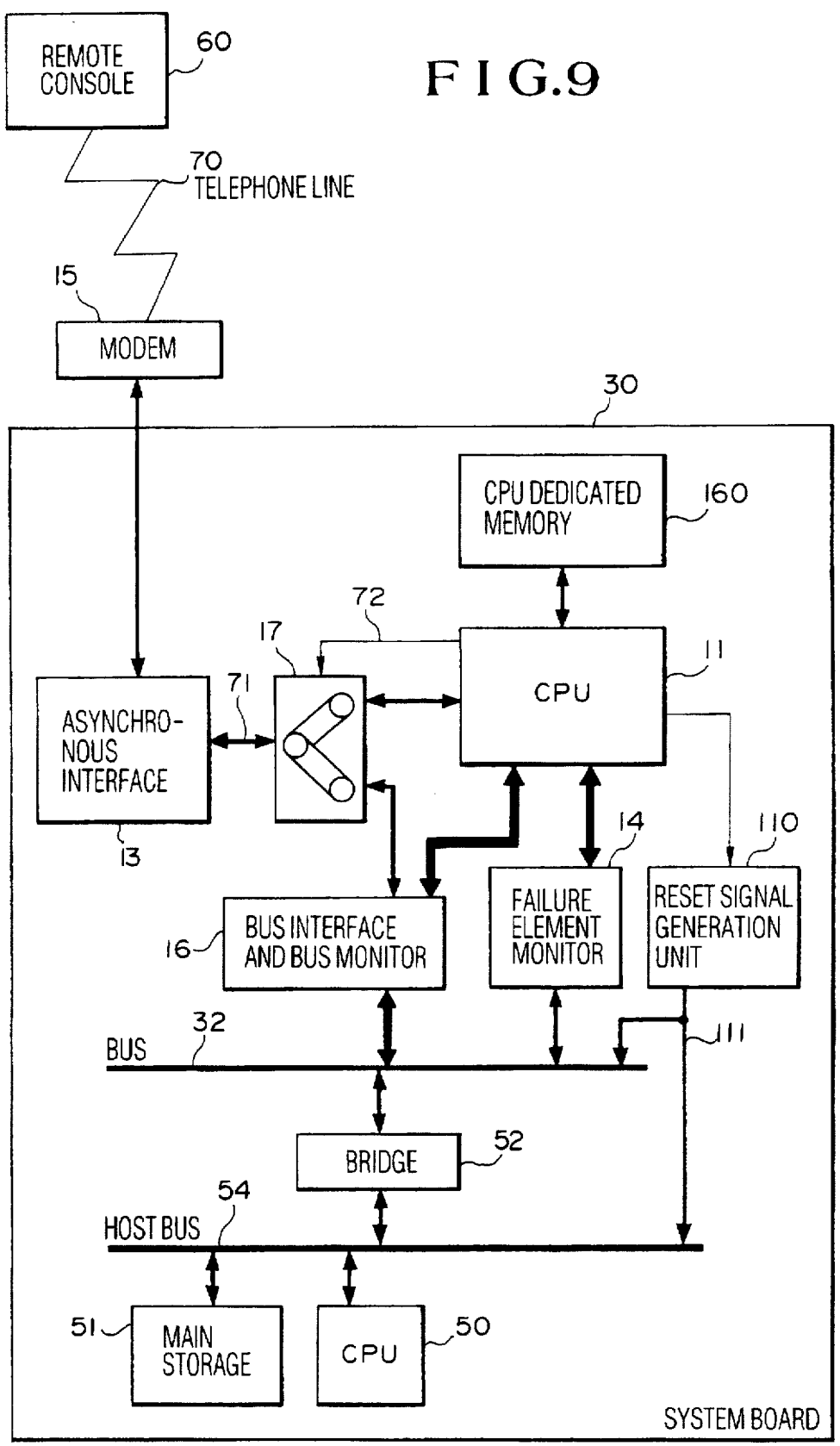
FIG. 9 shows an other embodiment of the present invention.

FIG. 9 shows an embodiment for implementing the present invention on the system board 30. In the embodiment of FIG. 9, when the system board 30 operates normally, the control signals 71 of the asynchronous interface 13 are connected to the bus interface and bus monitor 16 through the bus switch 17 and the CPU 50 on the system board controls to provide service to the remote console 60. In FIG. 9, when the CPU 11 detects a failure on the system board through the failure element monitor 14, it switches the bus switch 17 to connect the control signals 71 of the asynchronous interface 13 to the CPU 11. When the switching is completed, the CPU 11 controls the asynchronous interface 13 and informs the occurrence of the failure on the system board 30 to the remote console 60. When the informing of the failure is completed, the CPU 11 switches the bus switch 17 to connect the control signals 71 of the asynchronous interface 13 to the bus interface and bus monitor 16 and controls the reset signal generation unit 110 to reset the system board 30. Numeral 111 denotes reset signals on the system board.

Figure 8:
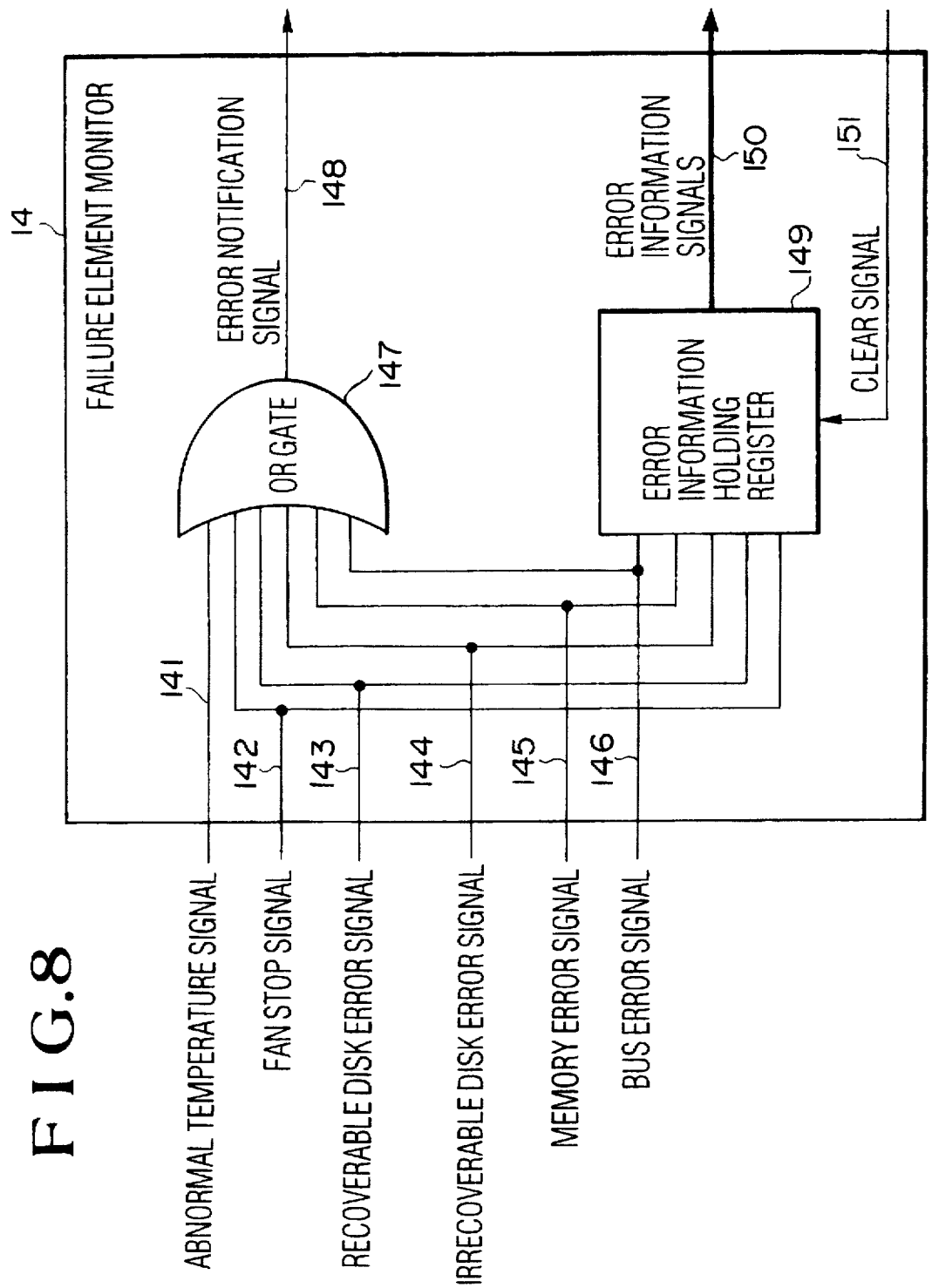
FIG. 8 shows an internal construction of a failure monitor.

FIG. 8 shows an internal configuration of the failure element monitor 14. The failure element monitor 14 includes an abnormal temperature signal 141 indicating abnormal rise of surrounding temperature of the system board, a fan stop signal 142 indicating the stop of a fan for cooling the surrounding of the system board 30 and a recoverable error signal 143 indicating the occurrence of recoverable disk error. The recoverable disk error means that in a disk array system represented by a RAID (redundant arrays of inexpensive disks) which is a file system comprising a plurality of hard disks, when a failure occurs in one of the disks, the remaining normally operating disks operate to supplement the fault so that the user need not pay attention to the fault and the overall operation of the system is not affected. An irrecoverable error signal 144 indicating the occurrence of the irrecoverable disk error. A memory error signal 145 indicating the occurrence of the memory error and a bus error signal 146 indicating the error on the bus are inputted, and when any of the error signals is valid, an error notification signal 148 is issued to the CPU 11 through an OR gate 147. Numeral 149 denotes an error information holding register for holding individual error signal information.

When the CPU 11 detects the occurrence of the failure by the error notification signal 148, it recognizes specific failure by the error information signals 150 outputted from the error holding register 149. When the CPU 11 recognizes the failure information, the CPU 11 clears the error holding register 149 by a clear signal 151.

Figure 10:
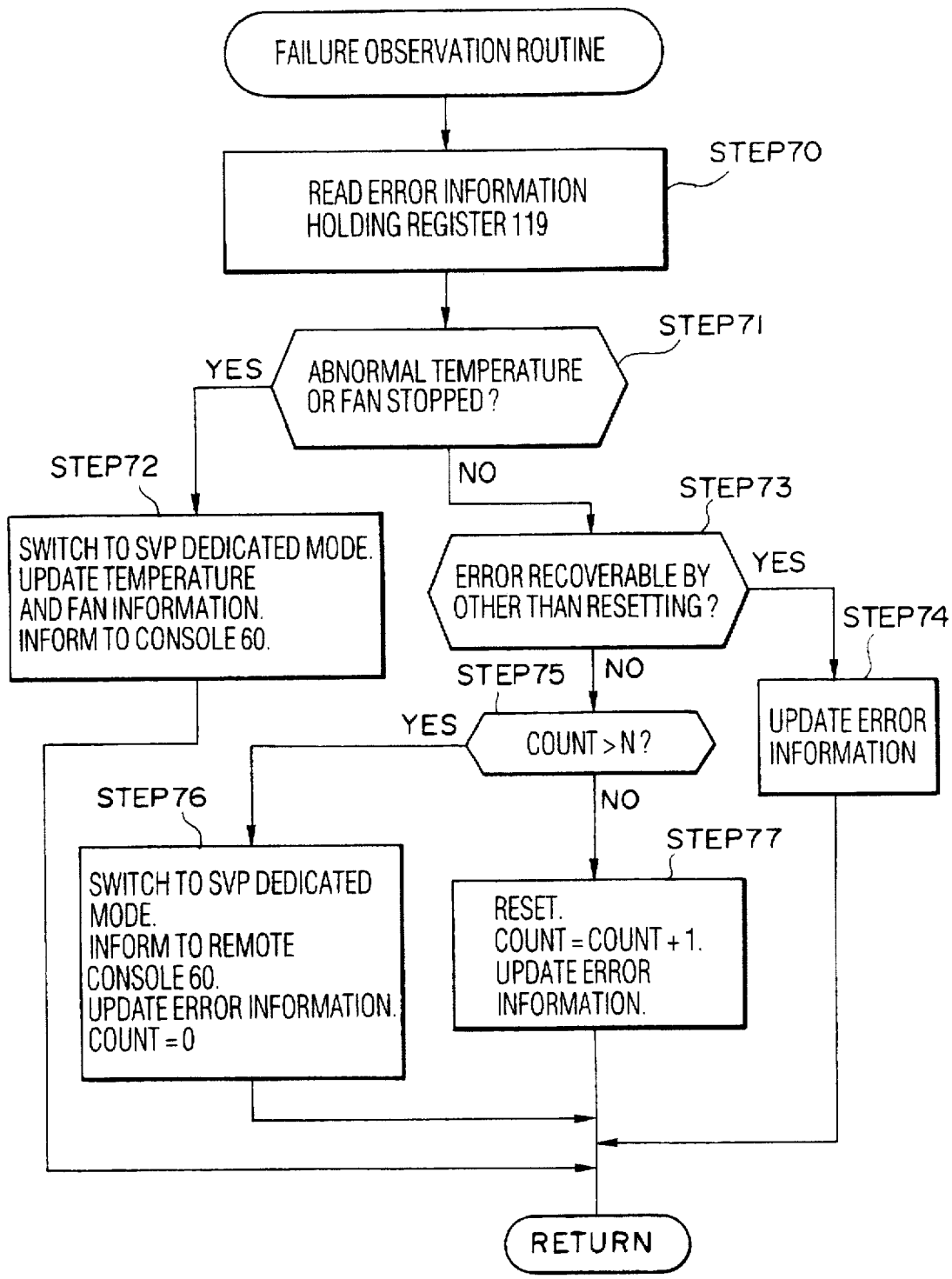
FIG. 10 shows a failure observation routine in the embodiment of FIG. 6.

FIG. 10 shows a process flow in an embodiment of the failure observation routine which is executed when the CPU 11 in the embodiment of FIG. 6 detects the occurrence of the failure. When the CPU 11 detects the occurrence of the failure by the error notification signal 148, it calls the failure observation routine shown in FIG. 10. The CPU 11 first reads the error information holding register 149 (step 70) and recognizes the content of the failure (step 71). If abnormal temperature or the stop of the fan is recognized in the step 71, the mode is switched to the SVP dedicated mode and the temperature and fan information in the memory 160 dedicated to the CPU 11 are updated and the content of the failure is informed to the remote console 60 (step 72). Then, the process returns.

In the step 71, if the failure is not fatal failure such as the abnormal temperature or the stop of the fan which cannot be recovered by the resetting, the process proceeds to a step 73 to check from the content of the error information holding register 149 whether the failure is one of the type which allows a normal operation by a reduced operation even if an error occurs in the disk array and which does not need the resetting (step 73). If the step 73 determines that the failure is recoverable without the resetting, it need not be informed to the remote user through the telephone line and the informing is omitted. In a step 74, the error in the memory 160 dedicated to the CPU 11 is updated and the process returns. If the failure is an irrecoverable error in the step 73, whether a variable COUNT representing the number of times of resetting of the system board is larger than N (where N is an integer no smaller than 1) or not is determined in a step 75. The value of COUNT is held in the memory 160 dedicated to the CPU 11. The value of COUNT is set to an initial value 0 when the CPU 11 starts the processing after the power-on. In a step 75, if the value of COUNT is larger than N, the process proceeds to a step 76 to switch the mode to the SVP dedicated mode, inform the failure information to the remote console 60 and update the error information in the memory 160 dedicated to the CPU 11. In a step 76, the value of COUNT is cleared to 0. When the step 76 is completed, the process returns. In the step 75, if the value of COUNT is smaller than N, the process proceeds to a step 77 to reset the system board 30, increment the value of COUNT by one and updates the error information in the memory 160 dedicated to the CPU 11.

Figure 11:
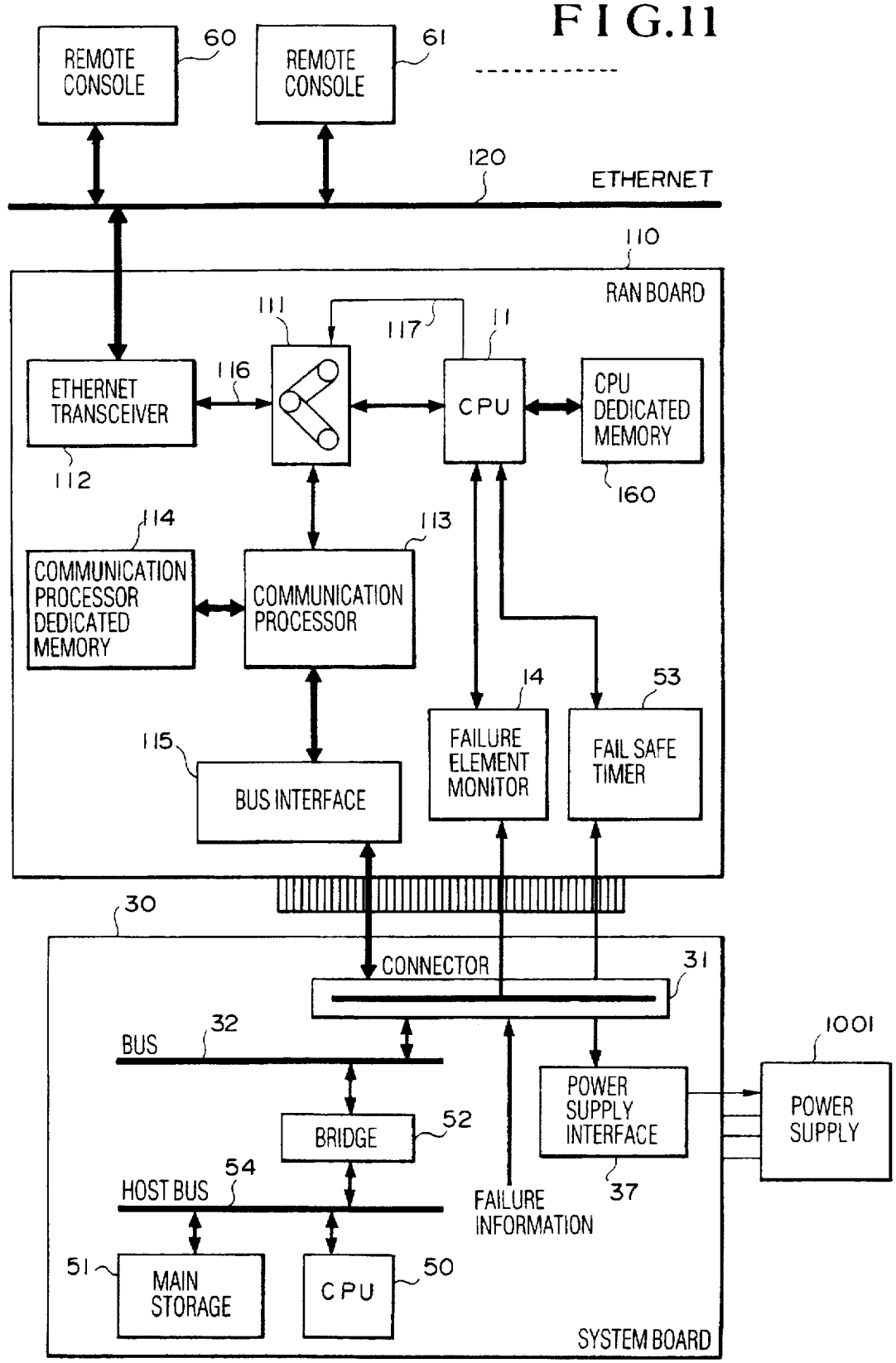
FIG. 11 shows a further embodiment of the present invention.

FIG. 11 shows an embodiment when the present invention is applied to an ETHERNET (trademark of Xerox Corp.) network control board. In FIG. 11, a control signal 116 of an ETHERNET transceiver 112 which is an interface between a LAN board 110 and an ETHERNET 120 is connected to a communication processor 113 by a bus switch 111 when the system board 30 operates normally. When the system board 30 operates normally, the communication processor 113 communicates with the main CPU 50 on the system board 30 through the bus interface 115 and the connector 31 to control the ETHERNET transceiver 112 to communicate with the remote consoles 60 and 61 connected to the ETHERNET 120. Numeral 114 denotes a dedicated memory which holds a program to be executed by the communication processor 113. When the CPU 11 detects the occurrence of the failure on the system board 30 or the overrun of the OS operating on the system board 30 by the failure element monitor 14 or the fail safe timer 53, it switches the bus switch 111 to connect the control signal 116 of the ETHERNET transceiver 112 to the CPU 11.

When the CPU 11 acquires the control of the ETHERNET transceiver 112, it informs the occurrence of the failure or the overrun of the OS to the remote consoles 60 and 61. The failure element monitor 14 and the fail safe timer 53 are described in detail in conjunction with FIGS. 8 and 6 and the explanation thereof is omitted here.

Figure 12:
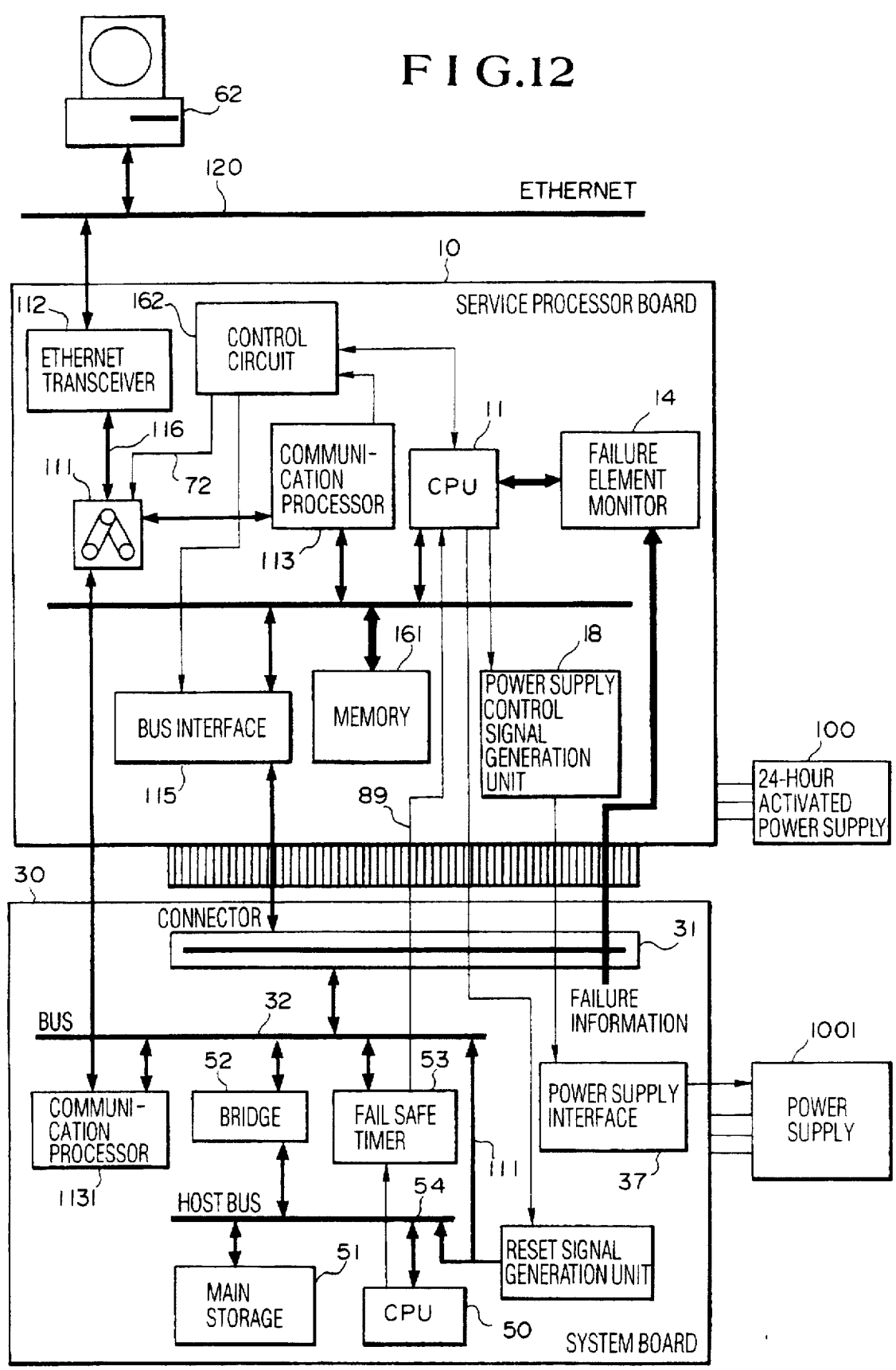
FIG. 12 shows a further embodiment of the present invention.

FIG. 12 shows an embodiment for providing means for reducing the power consumption of the service processor board 10 when the present invention is applied to the ETHERNET network controller. In FIG. 12, when the service processor board 10 or the system board 30 does not communicate with any information processing apparatus 62 on the ETHERNET 120 through the ETHERNET transceiver 112, the control signal 116 of the ETHERNET transceiver 112 is connected to the communication processor 113 through the switch 111 and the communication processor 113 monitors the data which continuously flows over the ETHERNET 120 through the ETHERNET transceiver 112. If the system board 30 is powered off, the processing units having the power saving mode other than the ETHERNET transceiver 112, the control circuit 162 and the communication processor 113 on the service processor board 10 are operated in the power save mode such as the deenergization of the internal clock.

For example, when the Intel Pentium Processor (trademark of Intel) is used as the CPU 11, a signal designated by a symbol STPCLK# is used to stop the clock of the internal timer to realize the power saving. The Pentium Processor and the power saving mode by stopping the internal clock are described in "Pentium (tm) processor Family User's Manual" Volume 1. Pentium (tm) Processor Family Data Book, order No. 241428, page 30–5.

When the communication processor 113 detects that the data flowing over the ETHERNET 120 through the ETHERNET transceiver 112 has an address for the service processor board 10, it issues a command to the control circuit 162 to return the mode of the service processor board 10 from the power saving mode to the normal operation mode. For example, when the Intel 82586 IEEE 802.3 ETHERNET LAN Coprocessor is used as the communication processor 113, an interrupt signal designated by a symbol INT may be used as the command to return to the normal operation mode. The 82586 is described in the Intel Data Book, 82586 IEEE 802.3 ETHERNET LAN COPROCESSOR, order No. 231246-007.

When the Advanced Micro Devices Am79C970A is used as the communication processor 113, if the data having a pattern which continuously repeats the target address 16 times is received as the data having the address for the service processor board 10, the communication processor 113 generates an interrupt signal. Accordingly, the interrupt signal (designated by a symbol $\overline{INTA}$) may be used as the command to return the mode from the power saving mode to the normal operation mode. The Am79C970A is described in the data book "PRELIMINARY Am79C970A" publication # 19436 Rev. A, Amendment/0, Issue Date: April 1995.

When the control circuit 162 receives the command, it returns the CPU 11 and other apparatus operating in the power saving mode to the normal operation mode. When the Intel Pentium Processor is used as the CPU 11, the signal designated by the symbol STPCLK# is used to return the internal clock of the processor from the stop mode to the normal clock operation mode to return the mode from the power saving mode to the normal operation mode. The Pentium Processor and the power saving mode by stopping the internal clock are described in the Pentium (tm) Processor Family User's manual, Vol. 1, Pentium (tm) Processor Family Data Book, order No. 241428, page 30–5.

When the mode is returned to the normal mode, the CPU 11 communicates with the information processing apparatus 62 requesting the communication on the ETHERNET through the communication processor 113 and the ETHERNET transceiver 112. In FIG. 12, numeral 161 denotes a memory for holding a program to be executed by the CPU 11. When the information processing apparatus 62 requesting the communication requests to turn on the power supply of the system board 30, the CPU 11 issues a command to turn on the power supply of the system board 30 to the power supply control signal generation unit 18 so that the power supply of the system board 30 is turned on. After the power-on, when the communication between the CPU 11 and the information processing appartatus 62 is over, the CPU 11 switches the switch 111 to connect the control signal 116 of the ETHERNET transceiver 112 to the communication apparatus 1131 on the system board 30. The switch 111 may be switched only when the switching is requested by the information processing apparatus 62. By the switching, the network OS executed by the processor on the system board 30 can communicate with any information processing apparatus 62 on the ETHERNET 120 through the ETHERNET transceiver.

On the other hand, when the power supply of the system board 30 is turned off after the system-down of the network OS as shown in the embodiment of FIG. 1 or when the network OS overruns as shown in the embodiment of FIG. 6, the CPU 11 switches the switch 111 to connect the control signal 116 of the transceiver 112 to the communication processor 113. Thus, any information processing apparatus on the ETHERNET 120 can communicate with the service processor board 10 to acquire the failure information derived from the failure element monitor 14 or issue the reset request to the system board 30.

When the CPU 11 completes the communication with the information processing apparatus on the ETHERNET 62 or detects the shut-down of the power supply of the system board 30 or receives the request to switch to the power saving mode from the information processing apparatus 62, it issues a command to the control circuit 162 to switch the apparatus having the power saving function on the service processor board 10 to the power saving mode. The embodiment of FIG. 12 relates to the ETHERNET network controller but the embodiment of FIG. 12 may be applied to a system using the asynchronous interface as represented by the modem 15 and the RS-232C by applying the ETHERNET transceiver 112 of FIG. 12 to the RS-232C driver/receiver 112 of FIG. 4 and the communication processor 113 to the RS-232C interface 19.

Figure 13:
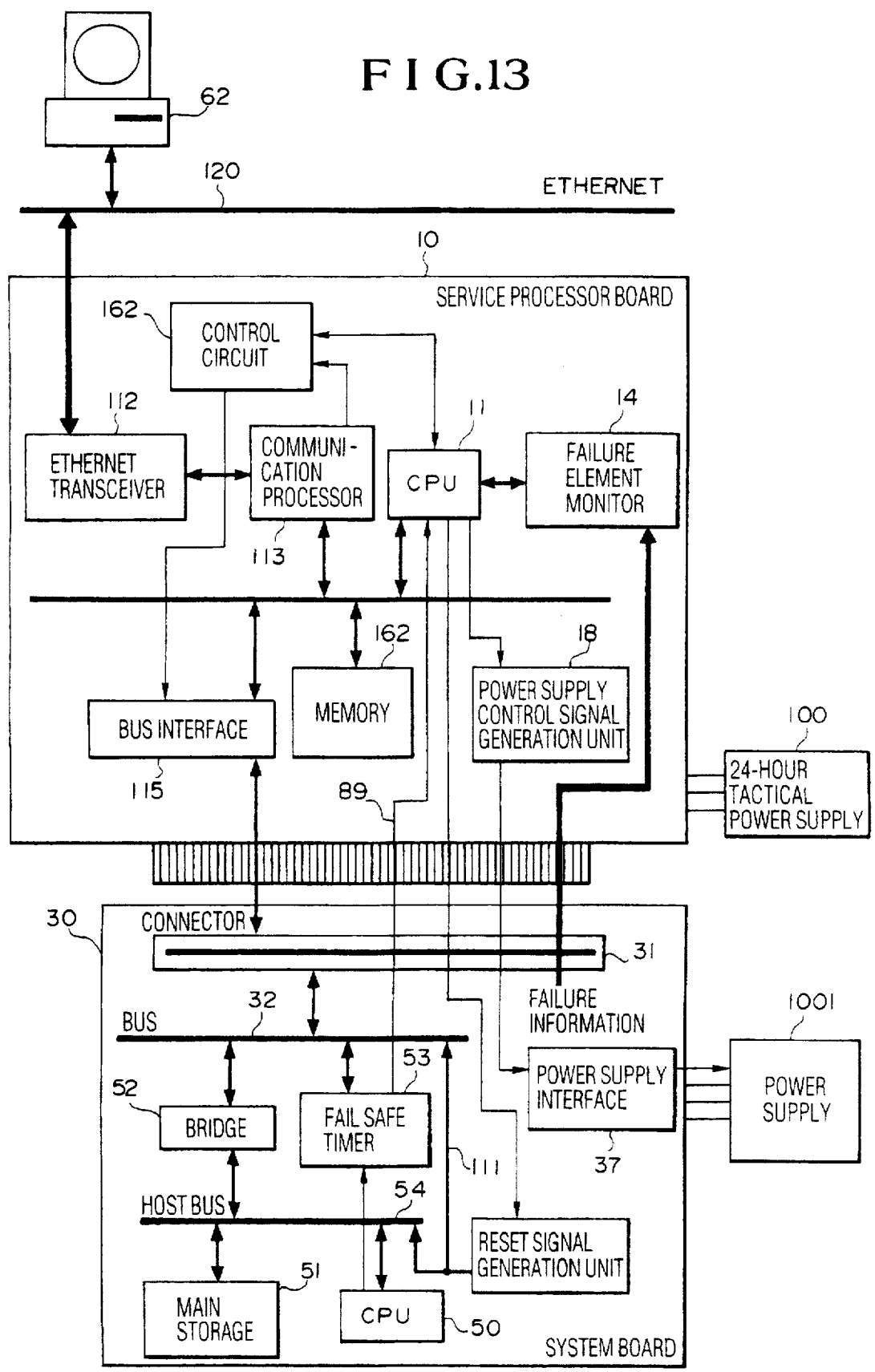
FIG. 13 shows a further embodiment of the present invention.

FIG. 13 shows an embodiment which implements the process of the embodiment of FIG. 12 by the CPU 11 and the processor on the system board 30 which share the ETHERNET transceiver 112 as well as the communication processor 113. In the embodiment of FIG. 13, the bus interface 115 is controlled by the control circuit 162 such that when the CPU 11 communicate with the information processing apparatus 62 on the ETHERNET 120 through the communication processor 113 and the ETHERNET transceiver 112, the signals between the CPU 11 and the communication processor 113 and the system board 30 are disconnected, and when the processor on the system board 30 communicates with the information processing apparatus 62 on the ETHERNET 120 through the communication processor 113 and the ETHERNET transceiver 112, the signals between the communication processor 113 and the system board 30 are connected. The condition to switch between the two modes is same as that of the embodiment of FIG. 12 and the explanation thereof is omitted here. In the mode in which the processor on the system board 30 controls the communication processor 113, the CPU 11 does not access to the communication processor 113 so that it does not impede the communication between the communication processor 113 and the system board 30.

The embodiment of FIG. 13 relates to the ETHERNET network controller but the embodiment of FIG. 13 may be applied to the system using the asynchronous interface as represented by the modem 15 and the RS-232C by applying the ETHERNET transceiver 112 of FIG. 13 to the RS-232C driver/receiver 112 of FIG. 4 and applying the communication processor 113 to the RS-232C interface 19.

Figure 14:
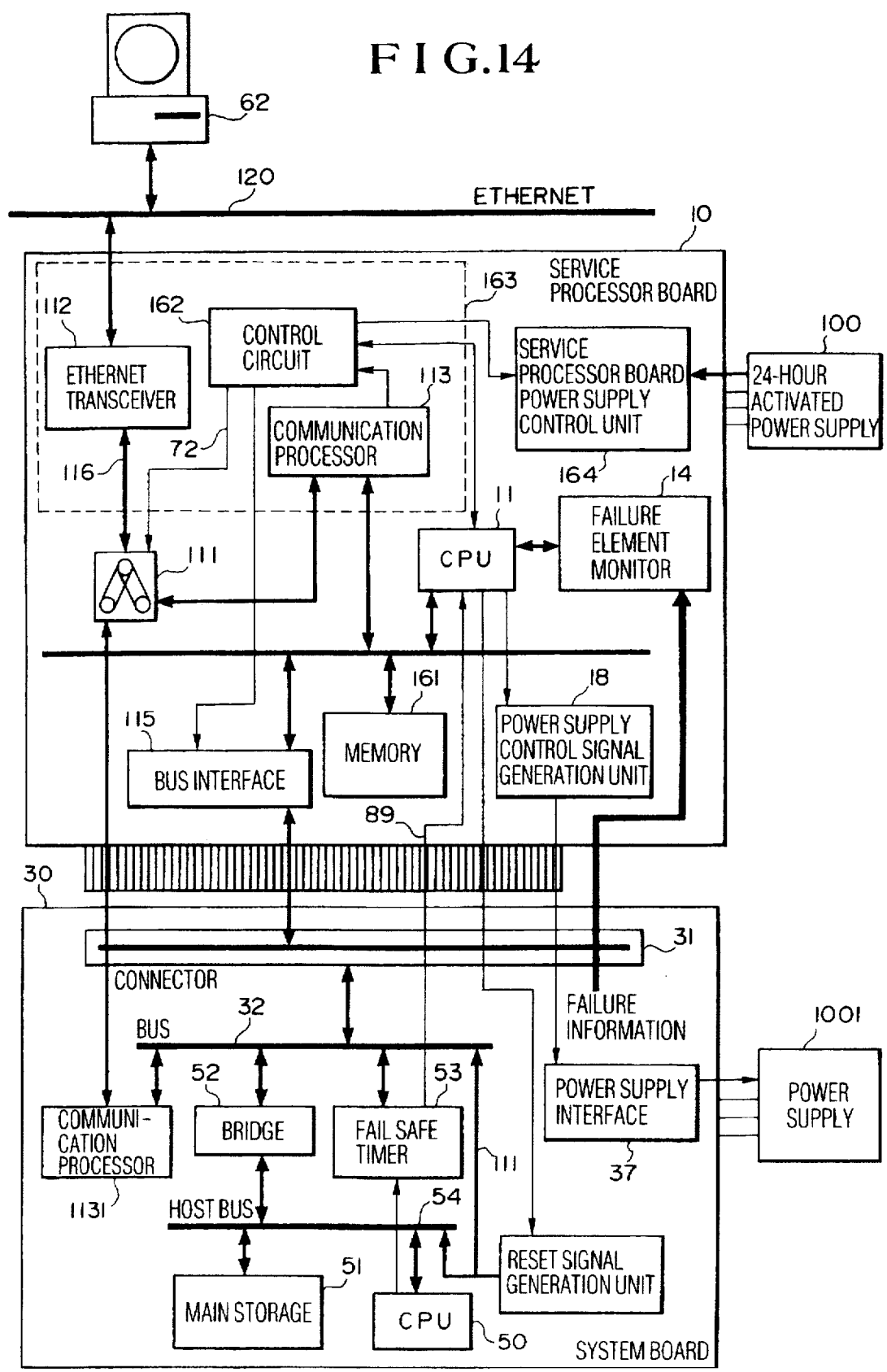
FIG. 14 shows a further embodiment of the present invention.

FIG. 14 shows an embodiment for attaining the power saving by turning off the power supplies of the apparatus other than the ETHERNET transceiver 112, the communication processor 113 and the control circuit 162. In FIG. 12, the ETHERNET transceiver 112, the communication processor 113 and the control circuit 162 are continuously powered 24 hours, and when the service processor board 10 or the system board 30 does not communicate with any information processing apparatus 62 on the ETHERNET 120 through the ETHERNET transceiver 112, the control signal 116 of the ETHERNET transceiver 112 is connected to the communication processor 113 through the switch 111 and the communication processor 113 continuously monitors the data flowing over the ETHERNET 120 through the ETHERNET transceiver 112. If the power supply of the system board 30 is off, the apparatus other than the ETHERNET 112, the control circuit 162 and the communication processor 113 are kept powered off.

When the communication processor 113 detects that the data flowing over the ETHERNET 120 through the ETHERNET transceiver 112 has an address for the service processor board 10, it issues to the control circuit 162 a command to turn on the power supply of the service processor board 10. When the control circuit 162 receives the command, it issues a command to the service processor board power supply control unit 164 to turn on the power supplies of the off-state apparatus on the service processor board. Thus, the CPU 11 on the service processor board is powered on and executes the program held in the memory 161 and starts the communication with the information processing apparatus requesting the communication on the ETHERNET 120 through the communication processor 113 and the ETHERNET transceiver 112.

When the information processing apparatus 62 requests to turn on the power supply of the system board 30, the CPU 11 issues to the power supply control signal generation unit 18 to turn on the power supply of the system board 30 so that the system board 30 is powered on. After the power-on, when the communication between the CPU 11 and the information processing apparatus 62 is over, the CPU 11 switches the switch 111 to connect the control signal 116 of the ETHERNET transceiver 112 to the communication apparatus on the system board 30. The subsequent switching process is similar to that of the embodiment of FIG. 12.

On the other hand, when the power supply of the system board is turned off after the system-down of the network OS as shown in the embodiment of FIG. 1 or when the network OS overruns as shown in the embodiment of FIG. 6, the CPU 11 switches the switch 111 to connect the control signal 116 of the ETHERNET transceiver 112 to the communication processor 113. Like in the embodiment of FIG. 12, any information processing apparatus 62 on the ETHERNET 120 can communicate with the service processor board 10 and acquire the failure information derived from the failure element monitor 14 and issue a reset request to the system board 30.

When the CPU 11 completes the communication with the information processing apparatus on the ETHERNET 120 or receives the request to turn off the power supply of the service processor board 10 from the information processing apparatus 62, it issues a command to the control circuit 162 to turn off the power supplies of the units on the service processor board 10 which can be powered off. The embodiment of FIG. 14 relates to the ETHERNET network controller but the embodiment of FIG. 14 may by applied to the system using the asynchronous interface as represented by the modem 15 and the RS-232C by applying the ETHERNET transceiver 112 of FIG. 14 to the RS-232C driver-receiver of FIG. 4 and the communication processor 113 to the RS-232C interface 19.

Figure 15:
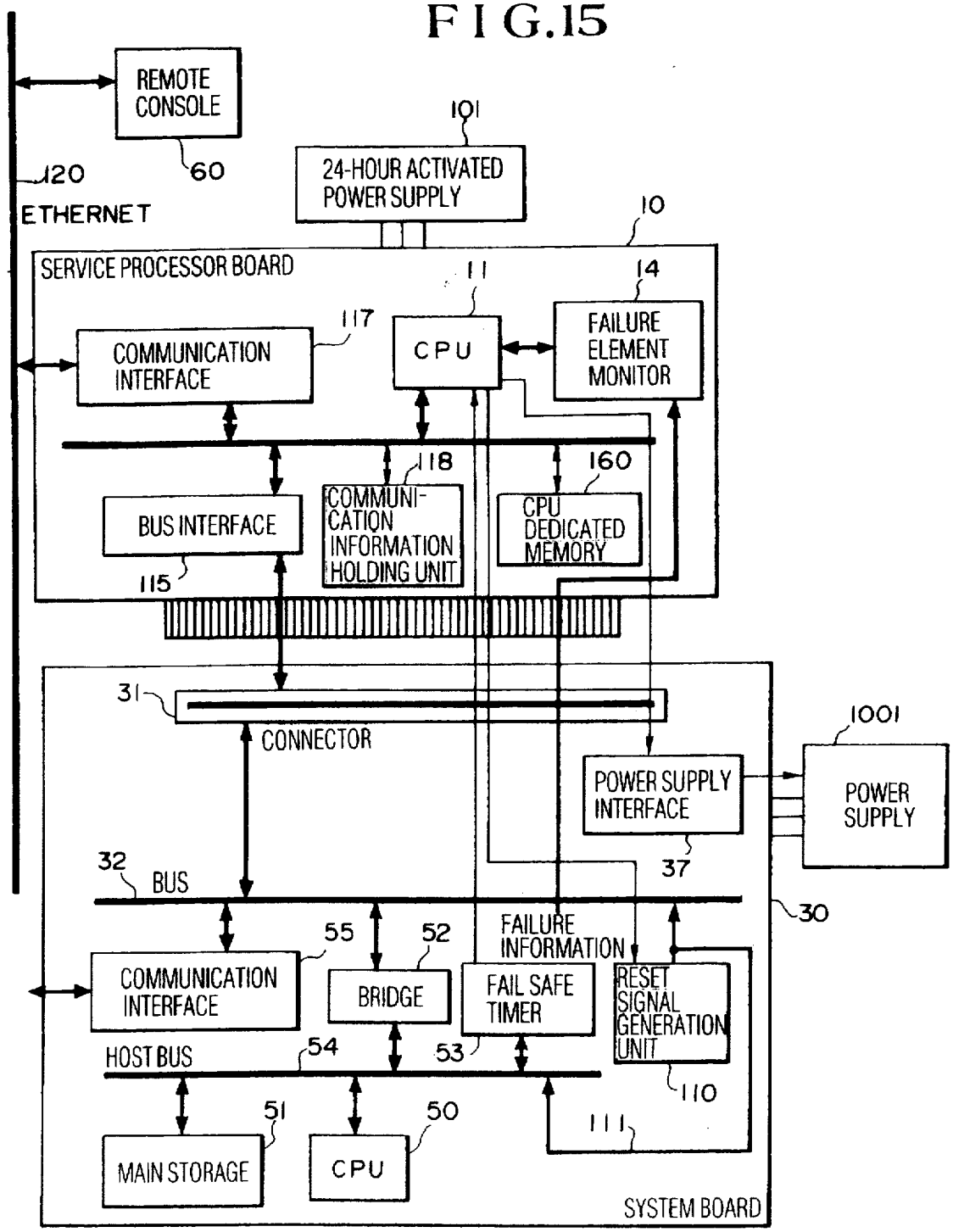
FIG. 15 shows a further embodiment.

FIG. 15 shows an embodiment for implementing the present invention in the ETHERNET network controller by connecting the communication interface 117 on the service processor board 10 and the communication interface 55 on the system board 30 by the ETHERNET 120 in the daisy chain fashion, instead of switching the control signal 116 of the ETHERNET transceiver 112 a shown in FIG. 12. In FIG. 15, the communication interface 117 and the communication interface 55 are communication control units which comprise the processing apparatus such as the ETHERNET transceiver 112 and the communication processor 113 in FIG. 12.

In FIG. 15, when the power supply of the system board is turned off or when the operating system executed by the CPU 50 on the system board 30 overruns or is down, the communication interface 117 communicates with other information processing apparatus whose target of communication is the system board 30 through the ETHERNET 120. When the power supply of the system board 30 is turned off and the communication interface 117 receives the communicated data having the address for the system board 30 from other information processing apparatus through the ETHERNET 120, the communication interface 117 issues an interrupt request to the CPU 11. When the CPU 11 receives the interrupt request, it starts the communication with the information processing apparatus through the communication interface 117.

When the CPU 11 receives the power-on command to the system board 30, it powers on the system board 30. A specific process therefor is similar to that in the embodiment of FIG. 12 and the explanation thereof is omitted here. The service processor board 10 is continuously activated by the 24-hour activated power supply 100 as it is in the embodiment of FIG. 12, and the units on the service processor board 10 other than the communication interface 117 may be in the power saving mode as they are in the embodiment of FIG. 12 or powered off as they are in the embodiment of FIG. 14.

The methods for switching from the power saving mode to the normal mode and from the power-off mode to the normal power-on mode may be similar to those in the embodiments of FIGS. 12 and 14, respectively and the explanation thereof is omitted here. After the CPU 11 has turned off the power supply of the system board 30, it terminates the communication with other information processing apparatus through the ETHERNET 120. When the network operating system executed by the CPU 50 on the system board 30 is started, the operating system starts the communication with the information processing apparatus on the ETHERNET 120 through the communication interface 55 on the system board 30.

After the start of the operating system, the CPU 11 on the service processor board 10 communicates with the operating system executed by the CPU 50 through the bus interface 115, the connector 31, the bridge 52 and the host bus 54 and acquires the address information for the information processing apparatus on the ETHERNET 120 with which the operating system communicates and holds it in the communication information holding unit 118. When the CPU 11 detects the occurrence of the failure on the system board 30 through the failure element monitor 14 or detects the overrun of the operating system by the method shown in FIG. 6, it acquires the address information for the information processing apparatus with which the operating system is to communicate from the information of the communication information holding unit 118, and informs to the information processing apparatus the occurrence of the failure and the overrun of the operating system through the communication interface 117 and the ETHERNET 120.

The information processing apparatus which has been communicating with the operating system may recognize the state of the system mode even if it can no longer communicate with the operating system by receiving the information on the occurrence of the failure and the overrun of the operating system from the service processor board 10.

The above embodiments offer the following effects. The information processing system switches the control signal of the asynchronous interface for controlling the modem by the switching means in accordance with the switch signal from the service processor for managing the system board such that either the system board or the service processor conducts it, the service may be provided to the external client by only one set of communication line and modem. Thus, a very economical system is provided.

The service processor issues the switch signal to the switching means when the failure notification information is inputted from the bus monitor or the failure element monitor, and after the connection with the communication apparatus, it attempts to recover the system board, and when the failure is recovered, it issues the switch signal to the switching means to cause the communication apparatus to control the system board so that the remote user can continuously grasp the failure of the system board without disconnection of the line even if the failure occurs and attain the rapid recovery of the failure of the system board.

Even if the system board is powered off, the service processor sends the power-on command to the power supply interface in accordance with the power-on request information of the power supply of the system board from the remote user. Accordingly, the system board power supply is normally turned off and the system board is started only on request by the remote user so that the power consumption of the system board is saved. By supplying the power to the information processing apparatus only during the time band in which the access to the user is frequently made and shutting off the power during the time band in which the access from the user is small such as at midnight, the 24-hour service to the user is attained while the power consumption is reduced.

The communication service board of the embodiment may be connected to the existing information processing apparatus having no service processor board by connecting the communication service board by utilizing the connecting terminal for exchanging signals with the external.

When the communication service board or the server does not communicate with the remote console communicatable thorough the modem and the communication line connected to the communication service board, the processing apparatus having the power saving function on the communication service board is switched to the power save mode or the power supply of the processing apparatus is shut off so that the power consumption of the communication service board which is continuously powered is minimized.

As shown in an embodiment of FIG. 15, the communication interface on the communication service board and the communication interface on the system board are daisy-chain connected through the communication line, and the communication service board acquires the address information of any information processing apparatus with which the operating system operating on the system board of the server communicates, by communicating with the operating system, and when the failure occurs on the server or the operating system operating on the server overruns, the communication service board can transmit the failure information of the server and the information on the state of the operating system to any information processing apparatus with which the operating system has been communicating so that any information processing apparatus receiving the service of the operating system can recognize the state of the server in any condition.

What is claimed is:

1. An information processing system comprising:

a communication apparatus for communicating with an external terminal through a communication line;

an information processing apparatus for communicating with said external terminal through said communication apparatus;

processing means for managing said information processing apparatus;

a processing means power supply for continuously supplying a power to said communication apparatus and said processing means;

an information processing apparatus power supply for supplying a power to said information processing apparatus;

on/off processing means for turning on and off the power from said information processing apparatus power supply to said information processing apparatus by a command from said processing means; and switching means for connecting said communication apparatus to said processing means or said information processing apparatus in accordance with a switching signal from said processing means;

said processing means controlling said switching means to connect said communication apparatus to said processing means when said information processing apparatus power supply is in the off state;

said processing means outputting a power-on command to said on/off processing means when said processing means receives a power-on request of said information processing apparatus power supply from the external terminal through said communication line and said communication apparatus and manipulating said switching means to connect said communication apparatus to said information processing apparatus when the execution of the power-on command is completed.

2. An information processing system according to claim 1 wherein;

said processing means includes means for observing a state of the power supply from said information processing apparatus power supply to said information processing apparatus, said processing means sends a switch signal to said switching means when said processing means observes the change of the state of the power supply from the on-state to the off-state to connect said communication apparatus to said processing means, and said processing means controls said communication apparatus.

3. An information processing system according to claim 1 wherein;

said processing means includes means for observing a state of the power supply from said information processing apparatus power supply to said information processing apparatus, said processing means sends a switch signal to said switching means when said processing means observes the change of the state of said power supply from the off-state to the on-state to connect said communication apparatus to said information processing apparatus, and said information processing apparatus controls said communication apparatus.

4. An information processing system according to claim 1 wherein;

said communication apparatus, said processing means, said switching means and said on/off processing means form a single communication service apparatus independent from said information processing apparatus, said information processing apparatus includes a connecting terminal for inputting and outputting signals to and from the external terminal, and said communication service apparatus is connected to said connecting terminal.

5. An information processing system according to claim 1 wherein;

said processing means includes a predetermined power saving mode, and said processing means is operated in the power saving mode when said information processing apparatus and said processing means are not communicating with said external terminal through said communication apparatus and said communication line and the power supply of said information processing apparatus is shut down.

6. An information processing apparatus according to claim 5 wherein said processing means returns from the power saving mode to a normal operation mode when said processing means receives communication data from said external terminal to said information processing system through said communication line and said communication apparatus.

7. An information processing system according to claim 5 wherein said processing means operates in the power saving mode when a request to change to the power saving mode is received from said external terminal through said communication line and said communication apparatus while said processing means is not operating in the power saving mode.

8. An information processing system according to claim 1 further comprising:

means for turning on and off the power supply from said processing means power supply to said processing means;

the power supply from said processing means power supply to said processing means being shut down when said information processing apparatus and said processing means are not communicating with said external terminal through said communication apparatus and said communication line and the power supply of said information processing apparatus is shut down.

9. An information processing system according to claim 8 further comprising:

means for turning on the power supply from said processing means power supply to said processing means when communication data for the information processing system is received from said external terminal through said communication line and said communication apparatus when the power supply from said processing means power supply to said processing means is shut off.

10. An information processing system according to claim 8 further comprising:

means for shutting down the power supply of said processing means when a request to shut down the power supply from said processing means power supply to said processing means is received from said external terminal through said communication line and said communication apparatus while said processing means is not operating in the power saving mode.

11. An information processing system comprising:

a communication apparatus for communicating with an external terminal through a communication line;

an information processing apparatus for communicating with said external terminal through said communication apparatus;

processing means for managing said information processing apparatus;

a processing means power supply for continuously supplying a power to said communication apparatus and said processing means;

an information processing apparatus power supply for supplying a power to said information processing apparatus;

on/off processing means for turning on and off the power from said information processing apparatus power supply to said information processing apparatus by a command from said processing means;

switching means for connecting said communication apparatus to said processing means or said information processing apparatus in accordance with a switching signal from said processing means; and means for detecting a failure in said information processing apparatus;

said processing means sending out a switch signal to said switching means when said failure detection means detects the failure in said information processing apparatus to connect said communication apparatus to said processing means;

said processing means communicating with said external terminal through said communication appartatus and said communication line to inform the failure to said external terminal.

12. An information processing system according to claim 11 wherein:

said processing means includes means for recovering the failed information processing apparatus, and said processing means conducts a recovery process when said processing means receives a request for the recovery process for said information processing apparatus from said external terminal.

13. An information processing system according to claim 12 wherein;

said processing means sends a switch signal to said switching means after the completion of the recovery process to connect said communication apparatus to said information processing apparatus, and said information processing apparatus controls said communication apparatus.

14. An information processing system according to claim 12 wherein said failure recovery process resets said information processing apparatus.

15. An information processing system according to claim 11 wherein said failure is overrun of an operating system executed on said information processing apparatus, and said failure detection means includes means for detecting the overrun of the operating system.

16. An information processing system according to claim 11 wherein;

said communication apparatus, said processing means, said switching means and said failure detection means form a single communication service apparatus independent from said information processing apparatus, said information processing apparatus includes a connecting terminal for inputting and outputting signals to and from the external terminal, and said communication service apparatus is connected to said connecting terminal.

17. An information processing system comprising:

a communication apparatus for communicating with an external terminal through a communication line;

an information processing apparatus for communicating with said external terminal through said communication apparatus;

processing means for managing said information processing apparatus;

a processing means power supply for continuously supplying a power to said communication apparatus and said processing means;

an information processing apparatus power supply for supplying a power to said information processing apparatus;

on/off processing means for turning on and off the power from said information processing apparatus power supply to said information processing apparatus by a command from said processing means;

switching means for connecting said communication apparatus to said processing means or said information processing apparatus in accordance with a switching signal from said processing means; and means for detecting a failure in said information processing apparatus and discriminating a type of the failure;

said processing means sending a switch signal to said switching means only for an irrecoverable failure when said means for detecting the failure and discriminating the type of the failure detects the failure in said information processing apparatus to connect said communication apparatus to said processing means, and said processing means communicating with said external terminal through said communication apparatus and said communication line to inform the failure.

18. An information processing system according to claim 17 further comprising:

recovery means for recovering the failure; and count means for counting the number of times of recovery of the failure;

said recovery means repeating the recovery process until the failure in said information processing apparatus is recovered when the detected failure is recoverable failure by said recovery means;

said processing means sending a switch signal to said switching means only when the failure in said information processing apparatus is not recovered after a predetermined number N of times of recovery process (where N is a positive integer) to connect said communication apparatus to said processing apparatus;

said processing means communicating with said external terminal through said communication apparatus and said communication line.

19. An information processing system according to claim 18 wherein said recovery process resets said information processing apparatus.

20. An information processing system comprising:

a first communication apparatus for communicating with an external terminal through a communication line;

an information processing apparatus for communicating with said external terminal through said first communication apparatus;

processing means for managing said information processing apparatus; and a second communication apparatus for communicating with said external terminal through said processing means and said communication line;

one of said information processing apparatus and said processing means communicating with said external terminal through the dedicated first or second communication apparatus;

wherein said processing means does not communicate with said external terminal when said information processing apparatus normally communicates with said external terminal through said first communication apparatus;

wherein said processing means includes means for communicating with an operating system operating on said information processing system, means for acquiring address information of said external terminal with which said information processing apparatus communicates through said first communication apparatus and means for detecting overrun of the operating system, and said processing means includes means for informing the overrun of the operating system to said external terminal with which the operating system has been communicating, through said second communication apparatus based on the address information when said overrun detection means detects the overrun of the operating system operating on said information processing apparatus.

21. An information processing system according to claim 20 wherein said first communication apparatus and said second communication apparatus are connected to a single communication line in daisy chain fashion.

22. An information processing system comprising:

a first communication apparatus for communicating with an external terminal through a communication line;

an information processing apparatus for communicating with said external terminal through said first communication apparatus;

processing means for managing said information processing apparatus; and a second communication apparatus for communicating with said external terminal through said processing means and said communication line;

one of said information processing apparatus and said processing means communicating with said external terminal through the dedicated first or second communication apparatus;

wherein said processing means does not communicate with said external terminal when said information processing apparatus normally communicates with said external terminal through said first communication apparatus;

wherein said processing means includes means for communicating with an operating system operating on said information processing apparatus, means for acquiring address information of said external terminal with which said information processing apparatus communicates through said first communication apparatus and means for detecting failure caused in said information processing apparatus, and said processing means includes means for informing the failure information to said external terminal with which the operating system has been communicating, through said second communication apparatus based on the address information when said failure detection means detects the failure caused by said information processing apparatus.

23. An information processing system according to claim 22 wherein said first communication apparatus and said second communication apparatus are connected to a single communication line in daisy chain fashion.

* * * * *